United States Patent
Rueckriem

(10) Patent No.: US 7,715,784 B2
(45) Date of Patent: May 11, 2010

(54) AUTOMATIC SELECTION OF THE TRANSMISSION STANDARD IN MOBILE TELEVISION RECEIVERS

(75) Inventor: Reinhard Rueckriem, München (DE)

(73) Assignee: Infineon Technologies AG, Neubiberg (DE)

(*) Notice: Subject to any disclaimer, the term of this patent is extended or adjusted under 35 U.S.C. 154(b) by 795 days.

(21) Appl. No.: 11/530,299

(22) Filed: Sep. 8, 2006

(65) Prior Publication Data

US 2007/0082604 A1    Apr. 12, 2007

Related U.S. Application Data

(63) Continuation of application No. PCT/DE2005/000217, filed on Feb. 9, 2005.

(30) Foreign Application Priority Data

Mar. 10, 2004    (DE) .................. 10 2004 011 706

(51) Int. Cl.
*H04H 60/09*    (2008.01)
(52) U.S. Cl. .................. 455/3.04; 455/522; 455/69; 455/13.4; 455/127.1; 455/127.5; 455/3.03; 455/179.1; 370/360
(58) Field of Classification Search .................. 455/518, 455/519, 3.05, 3.04, 90.2, 415, 417, 418, 455/422.1, 3.03, 103, 179.1, 522, 69, 13.4, 455/127.1–127.5, 455; 370/260, 261, 262, 370/432, 352, 333, 360, 364, 431, 463; 709/204, 709/220; 713/320; 725/95
See application file for complete search history.

(56) References Cited

U.S. PATENT DOCUMENTS

| | | | | |
|---|---|---|---|---|
| 2002/0059641 | A1* | 5/2002 | Tsujimura et al. | 725/135 |
| 2002/0086637 | A1 | 7/2002 | Baese et al. | 455/3.02 |
| 2003/0009578 | A1 | 1/2003 | Apostolopoulos et al. | 709/231 |
| 2003/0009765 | A1* | 1/2003 | Linden et al. | 725/95 |
| 2003/0038897 | A1 | 2/2003 | Shiotsu | 348/725 |
| 2005/0181799 | A1* | 8/2005 | Laroia et al. | 455/450 |

FOREIGN PATENT DOCUMENTS

| | | |
|---|---|---|
| EP | 1207698 A2 | 5/2002 |
| EP | 1549069 | 6/2005 |
| JP | 63157242 U | 10/1988 |
| JP | 2002232793 A | 8/2002 |
| JP | 2003161909 | 6/2003 |
| JP | 2004056178 | 2/2004 |
| WO | 2005088879 | 9/2005 |

OTHER PUBLICATIONS

Henriksson, DVB-H Outline, pp. 2, 5, 17, Dec. 9, 2003.
International Search Report with Written Opinion, PCT/DE2005/000217, 9 pages, Aug. 18, 2005.
The Japanese Office Action for Japanese Application No. 2007-502179 dated May 26, 2009 (4 pages).

* cited by examiner

*Primary Examiner*—Matthew D Anderson
*Assistant Examiner*—Shaima Q Aminzay
(74) *Attorney, Agent, or Firm*—Dicke, Billig & Czaja, PLLC

(57) ABSTRACT

In a radio system for transmitting information channels A1, A2, A3 to radio receivers, the information channels A1, A2, A3 are transmitted in parallel over a number of data channels, each using different transmission standards. A radio receiver selects a transmission standard based on the type of its energy supply.

9 Claims, 1 Drawing Sheet

AUTOMATIC SELECTION OF THE TRANSMISSION STANDARD IN MOBILE TELEVISION RECEIVERS

CROSS-REFERENCE TO RELATED APPLICATION

This application is a continuation of co-pending International Application No. PCT/DE2005/000217 filed Feb. 9, 2005, which designates the United States, and claims priority to German application number DE 10 2004 011 706.3 filed Mar. 10, 2004.

TECHNICAL FIELD

The invention relates to a radio system for the transmission of information channels with the help of different transmission standards. The invention further relates to a radio receiver, which selects a transmission standard from the different transmission standards for receiving the information channels and a method for operating the radio system according to the invention and the radio receiver according to the invention.

BACKGROUND

Analog or digital transmission standards are used for the transmission of information channels, such as radio programs or television programs. The transmission to the end consumer takes place mostly over terrestrial radio or cable links or based on satellites. In particular, the introduction of the digital, terrestrial television according to the transmission standard DVB-T (Digital Video Broadcasting Terrestrial) is intended in the years 2003 and 2004. The objective of this transmission standard is primarily the achievement of a high picture quality in stationary, not mobile receivers. The high power consumption of the receiver associated therewith prevents a practical use of this transmission standard in mobile receivers.

The standard DVB-H (Digital Radio Broadcasting-Handheld) was developed in order to enable a practical television reception even on mobile, portable receivers. This standard is characterized by a lower picture resolution as is sufficient for the generally relatively small display elements of mobile receivers and a lower transmission rate. However, a special characteristic of this transmission standard is a so-called time-slicing method, in which the transmission of the data takes place in sections limited in terms of time in the form of so-called data bursts. The transmitter can thus transmit, for example, several information channels in a time-division multiplex operation. A great advantage of this transmission standard is that extensive areas of the receiver can be switched off in the time spans between the incoming data bursts. This is associated with a considerable saving of energy, which substantially increases the operating time of mobile receivers.

SUMMARY

A radio transmitter for the transmission of information channels to a number of radio receivers, can be designed to transmit at least one information channel in parallel over a first data channel using a first transmission standard and over a second data channel using a second transmission standard, wherein the first and the second transmission standards differ from one another and wherein the power consumption when receiving the first transmission standard is lower than the power consumption when receiving the second transmission standard.

BRIEF DESCRIPTION OF THE DRAWINGS

The radio receiver according to the invention is explained below in more detail based on a drawing and an exemplary embodiment.

DETAILED DESCRIPTION

Figure 1:
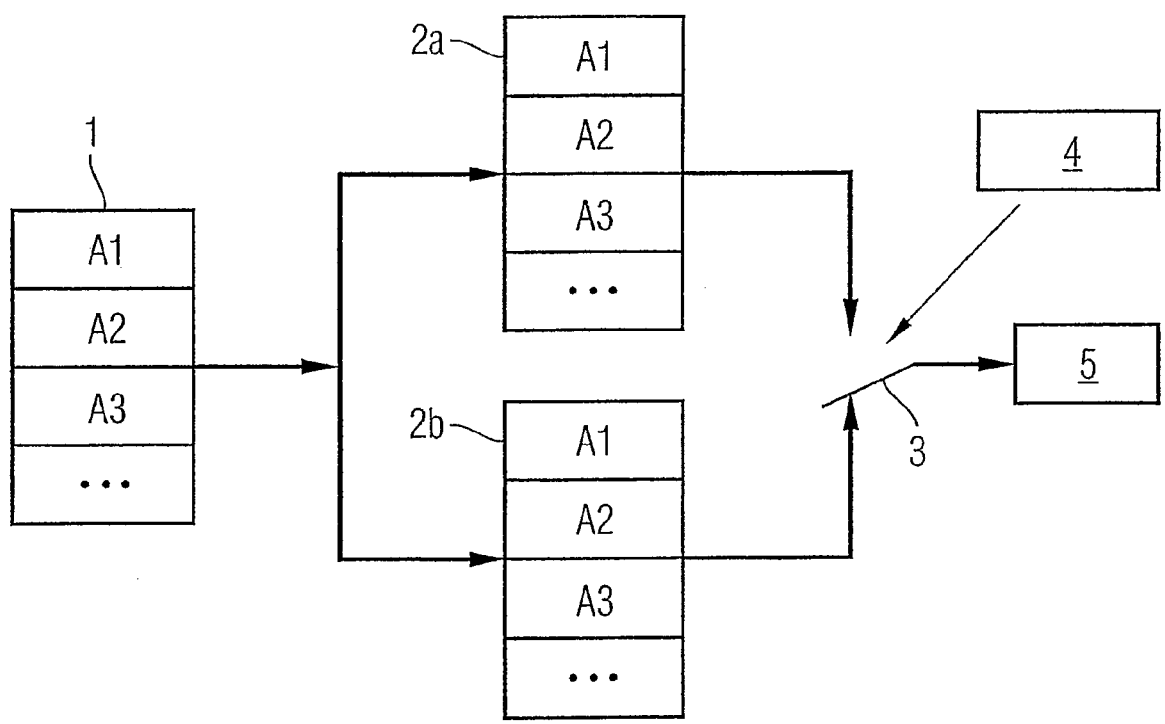
FIG. 1 shows an exemplary embodiment of a selection mechanism, with the help of which a data channel is selected in the radio receiver.

Different transmission standards can be used advantageously for the transmission of information channels to the end consumer. In a radio system and also a method for operating the radio system for the transmission of information channels to a number of radio receivers, at least one information channel is transmitted in parallel over a number of data channels each using a different transmission standard. Equivalent information can be transmitted simultaneously and in parallel over different data channels. The data channels pertinent to one information channel each transmit equivalent information, thus that information which is recognized by the user of a radio receiver to be equivalent or identical in terms of content. The different data channels thus form parallel, independent and alternatively selectable transmission paths of an information channel.

The data channels can be unidirectional, i.e., the receivers are passive receivers with respect to these data channels. Information can be transmitted within the data channels only in one direction. Therefore the data channels transmitted by the transmitter can be received or used simultaneously by a number of receivers. However, it is also possible to transmit personalized services ("Video on Demand," etc.) over the radio system to individual or groups of receivers. For this purpose, the data transmitted can be protected or encoded with a receiver-specific code so that only receivers, to which the corresponding code is known, can use the service or decode the data. Information channels can thus be offered, for example, in different degrees of detail at different rates with the help of the radio system.

The data channels pertinent to one information channel may differ in the transmission standard used in each case. In particular, the data rate of the different data channels of an information channel can vary. Thus the bandwidth between the data channels can also vary. The information channel can be transmitted over the different data channels, for example, in different quality standards (picture resolution, repeat rate, color depth, etc.). In offering an information channel in parallel over several data channels or over different transmission standards it may be advantageous that the transmission standards offered make distinctly different technical requirements of the radio receivers. The technical requirements can relate, for example, to certain minimum requirements, which the receiver must meet necessarily for using the respective transmission standard (computing power, storage space, etc.). The technical demands can also relate to indirect variables such as the electric power of the radio receiver, which is consumed by the receiver, for example, during the demodulation of a transmission standard. If the receiver cannot or should not use a first transmission standard although the corresponding data channel at the antenna is available, then the receiver uses a second transmission standard available over a second data channel with lower technical requirements, which can be met more easily or which are better adapted to the given circumstances.

In an embodiment, predominantly digital transmission standards can be used for the transmission of an information channel in the different data channels. In another embodiment of the radio system, the data channels can be transmitted terrestrially. In one embodiment, the different data channels can be transmitted by the same transmitter or by transmitters with closely adjoining locations. This may result in a largely identical spatial cover of the different data channels. A selection of different transmission standards with respect to an information channel is thus always possible.

In one embodiment of the radio system or the method for operating the radio system, a transmission standard can be used at least in one data channel. Said transmission standard uses a so-called time-slicing method. Here the data are transmitted only within limited time slots in the form of data bursts. The radio receiver can be switched off largely in the periods of time between adjoining time-slots. The average power consumption of the radio receiver can thus be reduced considerably. This is advantageous for mobile, portable receivers, in particular.

The radio system can be used for the most different types of information channels, such as for example, radio programs or television programs or data streams ("streaming", "Video on Demand") of data, particularly multimedia data of any type, such as for example, music titles and video clips. In one embodiment, the radio system can be designed for the transmission of television programs. The transmission standards used in the data channels may advantageously include the digital television transmission standards DVB-T (Digital Video Broadcasting Terrestrial) and DVB-H (Digital Video Broadcasting-Handheld). The DVB-T standard is intended for the terrestrial, digital transmission of television programs and is aimed implicitly at stationary receivers. The standard is characterized by a high picture quality adapted to large, high-resolution display elements. The DVB-H standard is intended for the reception of digital television programs on portable receivers. The standard is characterized by a reduced power consumption in the receiver with reduced picture quality as is sufficient for small display elements found typically in portable receivers.

Another aspect relates to a radio receiver and also a method for receiving information channels in a radio system, at least one information channel being transmitted in parallel over a number of data channels each using different transmission standards. The radio receiver is in a position to recognize and use, i.e., to process or to demodulate different transmission standards transmitted by the radio system.

In an embodiment of the method for receiving information channels, the data channel can be selected in the radio receiver from among the available data channels, over which available data channel a desired information channel will be received. In one embodiment, the selection of the data channel may take place by means of the selection of the information channel combined with the selection of a transmission standard. The selection of the information channel can be performed by the user.

In an embodiment, the selection of the transmission standard may take place based on operating information of the radio receiver. In a particularly embodiment of the radio receiver, means can be connected for selecting the transmission standard as a function of the type of the power supply of the radio receiver. If the radio receiver is supplied with energy over an electric network, then the selection means of the radio receiver selects, for example, a transmission standard which makes higher requirements (computing power, power consumption, etc.) of the radio receiver, however offers higher quality (picture resolution, color depth, repeat rate, etc.). If, on the other hand, the radio receiver obtains its electric energy from an energy source with limited capacitance (battery, rechargeable battery, etc.), then the selection means of the radio receiver selects a transmission standard with the reception of which the power consumption of the radio receiver is lower. In doing so it is possibly accepted that the information channel will be received with lower quality. The transmission standard is selected according to the type of energy supply and thus automatically.

In an embodiment, in the case of an energy supply with limited capacitance, a transmission standard can be selected, which uses a time-slicing method, such as, for example, the DVB-H standard. However, it is also feasible for the user to directly control the selection of the transmission standard or to establish different decision criteria for selecting the transmission standard.

In an embodiment of the radio receiver for receiving information channels, the means for selecting the transmission standard may switch between tables in which the reception information or channel information of each of the data channels available at the antenna for the available information channels, are stored according to known transmission standards.

In FIG. 1 an exemplary embodiment of a selection mechanism is illustrated, with the help of which a data channel is selected in the radio receiver. The different available information channels A1, A2, A3 are available at the user interface 1. In the case of a television receiver in place of a radio receiver, the information channels A1, A2, A3 correspond to the available television programs such as ARD, ZDF, 3sat, RTL and the like. The channel information of the data channels using the transmission standard DVB-T for the different information channels A1, A2, A3 is stored in table 2a. The equivalent channel information with respect to the transmission standard DVB-H is stored in table 2b. A switch 3 is switched by a control unit 4 as a function of the type of the energy supply of the radio receiver. If the radio receiver is supplied with energy over an electric network, then the switch 3 is switched in such a way that channel information of data channels from table 2a (transmission standard DVB-T) is supplied to the decoder 5. If, on the other hand, the radio receiver obtains its electric energy from a built-in battery or a built-in rechargeable battery, then channel information from the table 2b (transmission standard DVB-H) is supplied to the decoder 5. The selection as to which channel is received by the decoder 5 takes place automatically as a function of the type of the power supply of the radio receiver. If only one data channel and thus only one transmission standard is available to an information channel A1, A2, A3, then in an embodiment the channel information of this data channel is supplied to the decoder 5 in any case irrespective of the type of the energy supply.

Advantageously, additional communication channels are provided in the radio receiver, which enable a transmission of data from the receiver of the information channels to the transmitter. These additional communication channels can use known transmission standards such as GSM, UMTS, WLAN or Bluetooth.

The radio receiver can be operated with CW power of below 300 mW when receiving information channels over the DVB-H standard. In each case, 100 mW account for the receiving part and decoder. The remaining power is consumed mostly by the illumination of the display element. A 10 to 15 hour operation is thus possible, for example, on cellular phones of standard dimensions.

What is claimed is:

1. A radio receiver for receiving information channels, wherein an information channel is received over a first data channel using a first transmission standard and over a second data channel using a second transmission standard, wherein the first and the second transmission standards differ from one another, wherein the power consumption when receiving the first transmission standard is lower than the power consumption when receiving the second transmission standard and wherein the radio receiver is designed to receive the information channel over the first data channel if the radio receiver is supplied with power from a source having limited capacitance and to receive the information channel over the second data channel if the radio receiver is supplied with power over an electric power network.

2. A radio receiver according to claim 1, wherein the source having limited capacitance is a battery or a rechargeable battery.

3. A radio receiver according to claim 1, wherein means are provided for performing the selection of the transmission standard as a function of the type of the energy supply of the radio receiver.

4. A radio receiver according to claim 1, wherein the means for selecting the transmission standard switches between tables, in which the reception information of each of the data channels available at the receiver for the available information channels is stored according to known transmission standards.

5. A method for receiving information channels in a radio receiver, comprising the step of receiving an information channel in parallel over a first data channel using a first transmission standard and over a second data channel using a second transmission standard, wherein the first and the second transmission standards differ from one another, wherein the power consumption when receiving the first transmission standard is lower then the power consumption when receiving the second transmission standard, wherein the information channel is received over the first data channel if the radio receiver is supplied with power from a source having limited capacitance and wherein the information channel is received over the second data channel if the radio receiver is supplied with power over electric power network.

6. A method according to claim 5, wherein for selecting the transmission standard, a switch is made between tables in which the reception information of each of the data channels available at the receiver for the available information channels is stored according to the known transmission standards.

7. A method according to claim 5, wherein at least one transmission standard uses a time-slicing method.

8. A method according to claim 5, wherein the radio system is intended for the transmission of digital television programs.

9. A method according to claim 5, wherein the first transmission standard is digital video broadcasting-handhelds (DVB-H) and that the second transmission standard is digital video broadcasting-terrestrial (DVB-T).

* * * * *